(12) United States Patent
McConky et al.

(10) Patent No.: US 9,098,553 B2
(45) Date of Patent: Aug. 4, 2015

(54) SYSTEM AND METHOD FOR REMOTE ACTIVITY DETECTION

(71) Applicant: GridGlo LLC, Delray Beach, FL (US)

(72) Inventors: Katie McConky, Lockport, NY (US); Richard Viens, Gulf Stream, FL (US); Adam Stotz, Lancaster, NY (US); Travis Galoppo, Grand Island, NY (US); Thomas Fusillo, North Tonawanda, NY (US)

(73) Assignee: GridGlo LLC, Delray Beach, FL (US)

( * ) Notice: Subject to any disclaimer, the term of this patent is extended or adjusted under 35 U.S.C. 154(b) by 202 days.

(21) Appl. No.: 13/833,185

(22) Filed: Mar. 15, 2013

(65) Prior Publication Data

US 2014/0280208 A1 Sep. 18, 2014

(51) Int. Cl.
*G06F 17/30* (2006.01)

(52) U.S. Cl.
CPC .................... *G06F 17/3053* (2013.01)

(58) Field of Classification Search
CPC ... G06F 17/3053; G06F 17/30; G06F 11/079; G06F 11/3612; G06Q 50/06; G06Q 10/063; G06Q 10/06316; G08C 19/20; H04L 63/1408; H04L 63/062; H04L 63/08; H04L 9/0819; H04L 9/083; H04L 9/3226; H04L 9/3234; G01D 4/002; G08B 27/003; H02J 7/0052
USPC .................. 707/748, 715, E17.014, E17.017, 707/E17.044, E17.022, 173, 209, 197, 107, 707/236; 705/37, 412, 1, 30, 317, 347, 400; 702/189, 61, 60, 179; 455/456.5, 455/456.6, 456.1, 404.2, 456.2, 67.1, 67.11, 455/115.1; 709/224, 206; 714/39, 748, 714/E11.113, 746; 700/291, 296, 275, 295; 382/171, 173, 209, 197, 107, 236; 726/25, 23
See application file for complete search history.

(56) References Cited

U.S. PATENT DOCUMENTS

| | | | | |
|---|---|---|---|---|
| 5,586,126 | A * | 12/1996 | Yoder | 714/746 |
| 6,397,166 | B1 * | 5/2002 | Leung et al. | 702/179 |
| 6,549,463 | B2 * | 4/2003 | Ogura et al. | 365/185.18 |
| 8,180,873 | B2 | 5/2012 | Bhatt et al. | |
| 2002/0082886 | A1 * | 6/2002 | Manganaris et al. | 705/7 |

(Continued)

OTHER PUBLICATIONS

Angelo Costa et al.—"Sensor-driven agenda for intelligent home care of the elderly" Expert Systems with Applications—vol. 39, Issue 15, Nov. 1, 2012, pp. 12192-12204.*

(Continued)

*Primary Examiner* — Anh Ly
(74) *Attorney, Agent, or Firm* — Duane Morris LLP

(57) ABSTRACT

A system and method is disclosed for a remote activity detection process using an analysis of data streams of an entity such as an end user and/or a customer. In an embodiment, the detection process uses the data stream analysis to evaluate an entity's potential involvement in an activity based on individual measures for the entity such as comparison of the entity's data stream to the entity's peers, comparison of the entity's data stream to historical information for the entity, and/or comparison of the entity's data stream to data streams for a known second entity involved in the activity. The detection process may also use other information available which may impact the data points in a data stream, such as premises attributes associated with an entity, demographic attributes for the entity, financial attributes for the entity, and system alerts.

22 Claims, 12 Drawing Sheets

(56) References Cited

U.S. PATENT DOCUMENTS

| | | | |
|---|---|---|---|
| 2009/0240609 A1* | 9/2009 | Cho et al. | 705/30 |
| 2009/0248560 A1* | 10/2009 | Recce et al. | 705/35 |
| 2010/0076613 A1* | 3/2010 | Imes | 700/287 |
| 2010/0286937 A1* | 11/2010 | Hedley et al. | 702/60 |
| 2011/0307932 A1* | 12/2011 | Fan et al. | 725/110 |
| 2012/0278227 A1* | 11/2012 | Kolo et al. | 705/38 |
| 2012/0284790 A1* | 11/2012 | Bhargava | 726/22 |
| 2013/0045755 A1* | 2/2013 | Davis | 455/456.1 |
| 2013/0096987 A1* | 4/2013 | Omitaomu et al. | 705/7.34 |
| 2013/0103215 A1* | 4/2013 | Dai et al. | 700/291 |
| 2013/0191052 A1* | 7/2013 | Fernandez et al. | 702/60 |
| 2013/0226689 A1* | 8/2013 | Nemitz et al. | 705/14.41 |
| 2013/0227286 A1* | 8/2013 | Brisson | 713/168 |
| 2013/0227689 A1* | 8/2013 | Pietrowicz et al. | 726/23 |
| 2013/0307693 A1* | 11/2013 | Stone et al. | 340/573.1 |
| 2014/0035752 A1* | 2/2014 | Johnson | 340/601 |
| 2014/0074510 A1* | 3/2014 | McClung et al. | 705/3 |
| 2014/0163927 A1* | 6/2014 | Molettiere et al. | 702/189 |
| 2014/0214464 A1* | 7/2014 | Willis et al. | 705/7.12 |

OTHER PUBLICATIONS

Youngki Lee et al.—"Scalable Activity-Travel Pattern Monitoring Framework for Large-Scale City Environment" Published in: Mobile Computing, IEEE Transactions on (vol. 11, Issue: 4); Jun. 9, 2011—pp. 644-662.*

Mashima et al:, "Evaluating Electricity Theft Detectors in Smart Grid Networks"; Georgia Institute of Technology; pp. 1-20.

* cited by examiner

SYSTEM AND METHOD FOR REMOTE ACTIVITY DETECTION

BACKGROUND

Many utilities have begun the transition from using traditional analog or digital meters to installing smart meters at customer sites. These smart meters provide a number of technological advantages, one of them being the ability to communicate usage information directly with the utility. With the advent of smart meter technology the traditional utility meter reader is being replaced by automated communication methods between the utility and the smart meter directly. Once smart meters are installed in a utility's territory, there is no longer a need to send meter reading personnel to read each individual meter. A drawback of the lack of eyes in the field reading meters is the reduction of theft leads because traditionally many reports of energy theft came directly from the meter readers themselves as they were able to observe signs of meter tampering while reading the meters. The lack of eyes in the field to generate leads requires new ways to generate theft detection leads. Fortunately, smart meters provide a significant amount of data that can be used in the theft detection process, such that leads can be generated from data analysis processes instead of through direct meter visual observation.

Data analysis of steaming data is not limited to theft detection for a utility. Analogous to the streams of interval meter read data that are created by smart meters are processes outside the utility industry also creating streams of data. One can envision a series of credit card transactions as a stream of data, scans at a check-out counter for a particular cashier as a stream of data, or a series of shows watched on TV as reported by a cable box as a stream of data. These streams of data can all be monitored remotely and fused with other available data in order to evaluate the likelihood of the presence of an activity. The activity may be theft related or may be completely unrelated, such as monitoring a stream of data for signs of a change in household demographics.

Accordingly, there is a need for alternative systems, program products on machine-readable media, and methods for detecting the presence of an activity remotely by analyzing data streams along with other information available which may impact the data points in a data stream, as will be discussed in further detail below.

DETAILED DESCRIPTION

With reference to the figures where like elements have been given like numerical designations to facilitate an understanding of the present subject matter, various embodiments of a system and method for compensating for timing misalignments are described. In order to more fully understand the present subject matter, a brief description of applicable circuitry will be helpful.

Embodiments of the present disclosure provide a description of an activity detection process for use in a utility with smart meter implementations, or any other industry that can provide streams of user activity. The process is applicable to both electricity and gas theft detection processes, but is not limited to utility based theft detection. As discussed in further detail below, embodiments of the present disclosure combine information fusion techniques with machine learning algorithms in order to evaluate an entity's potential involvement in an activity based on three individual measures: comparison to their peers, comparison to self, and comparison to truth. By fusing interval data, externally acquired customer attributes, and system alerts such as meter events with state of the art machine learning processes a robust activity detection process is created.

As used herein, the term "entity" may refer to an individual person and/or customer and/or end user, a single household, a single premises, a single structure, an individual card (e.g., credit card, debit card, or similar financial-related device), or any similar thing or unit consistent with the application for which the disclosed system and method is employed.

Figure 1:
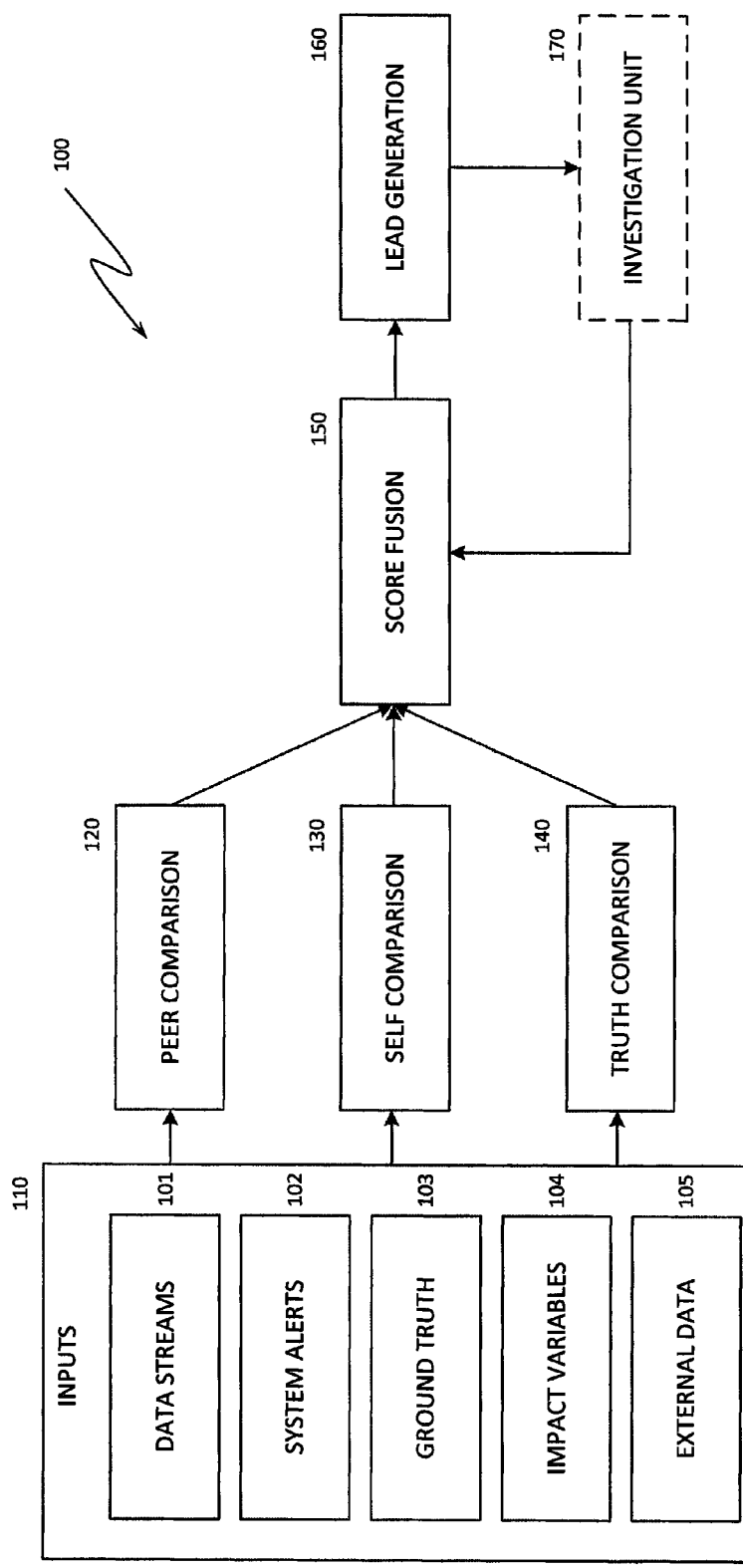
FIG. 1 is a high level flow chart for a remote activity detection process according to an embodiment of the present subject matter.

With attention drawn to FIG. 1, a high level flow chart 100 for a remote activity detection process is shown according to an embodiment of the present subject matter. In an embodiment, the remote activity detection process includes three separate scoring mechanisms used to evaluate an entity's potential for an activity. While the description of embodiments of the present subject matter may use energy theft as an example of an application, those of skill in the art will readily understand that the herein described embodiments are not so limited and that the present subject matter applies equally as well to detecting any chosen (or target) activity, not just energy theft.

A first scoring mechanism, or module or process, is a peer comparison module 120 which evaluates an entity's data stream as compared to the data streams of the entity's peers and calculates a peer comparison score. A second scoring mechanism is a self comparison module 130 which compares an entity's present data stream to the entity's historical data stream and calculates a self comparison score. A third scoring mechanism is a truth comparison module 140 which compares the entity's data stream to the data streams of known actors of an activity and calculates a truth comparison score. Each of the peer comparison, self comparison, and truth comparison modules functions using one or more of the set of inputs 110, where the inputs used by one module may be different than the inputs used for another module. The set of inputs 110 includes data streams 101, system alerts 102, ground truth data streams 103, impact variables 104, and external data 105. Each of these is discussed in more detail below.

After the three comparison scores are calculated, a fusion process is used in the score fusion process 150 to fuse the three individual scores and calculate a single activity confidence score. The score fusion process 150 may take on one or more of different forms. One form may determine an activity confidence score using a simple weighted average between the peer comparison module 120, the self comparison module 130, and the truth comparison module 140. In an embodiment, a more complex form may utilize machine learning techniques, such as a Bayesian Network in order to learn over time the correlation of the various modules' scores on actual target activity detection. The score fusion process 150 may also make use of internal system alerts to boost activity confidence scores where applicable. In a non-limiting example, in an energy theft detection scenario, the presence of meter alerts may be included in the score fusion process. Meter alerts may be correlated with the self comparison and truth comparison scoring modules in order to boost the confidence in those scoring modules.

A lead (i.e., an indicator that an entity is engaged in the target activity) may be generated in the lead generation block 160 from the activity confidence score. Additionally, the lead may be sent to an investigation unit 170 which may perform further investigation on the entity associated with the lead. In an embodiment, leads are generated based on the activity confidence scores coupled with any system alerts 102 that may be helpful in identifying the target activity. Leads may be prioritized based on any number of factors. As a non-limiting example, in an energy theft detection scenario, leads may be prioritized based solely on the activity confidence score, based on likelihood to recover revenue, or based on total amount of potential revenue recovery from an entity.

In an embodiment, once activity leads are generated by the lead generation block 160, a feedback process may be put in place to provide feedback to the score fusion process 150. The investigation unit 170 minimally needs to provide information as to whether or not the target activity was actually observed for an entity. The feedback process may be an automated process based on responses received by entities targeted by a target activity lead list from lead generation block 160. As a non-limiting example, in an energy theft detection scenario, the feedback from the investigation unit 170 may result from technicians in the field reporting back to the system the status of service investigations performed on the actual meters of the suggested theft detection leads. If the lead resulted in catching a thief, the feedback would be positive. If the lead was a false alarm the technician would report that back to the system as well. Feedback from the investigation unit may be provided back to the score fusion block 150 to refine the process used to calculate activity confidence scores.

In an embodiment, a data stream 101 is required for each of the peer comparison, self comparison, and truth comparison modules. Typically, the data stream is associated with a single entity. The contents of a data stream may vary by industry, but a data stream typically comprises a time series of data points for an entity. As a non-limiting example, in an electric utility industry scenario a data stream for an entity typically includes time series data corresponding to energy consumption data by the entity. In an embodiment, the entity in the case of an electric utility scenario is a single premises, and the data stream may be provided in relatively small time intervals such as every 15 minutes, hourly, or daily. As another non-limiting example, in a gas utility industry scenario the data stream for an entity would typically correspond to the amount of gas used by the entity during each reported time interval, which is typically reported in therms. As yet another non-limiting example, in a cable television industry scenario, the data stream for an entity may correspond to the series of channels watched by the entity, e.g., by the people in a particular household.

In an embodiment, a system alert 102 includes data available from, for example, an infrastructure. The system alerts can be used to help identify an activity of interest. In a non-limiting example, for an electric utility theft detection process, system alerts may correspond with alerts generated by smart meters, such as tamper alerts, customer account transitions (e.g., new account, canceled account), bill payment history, service information such as cuts in electric service or activation of a meter, as well as system wide outage information. In other industries the system alerts may correspond to a schedule of known programming, holiday schedules, or store hours. Other examples of system alerts 102 include, but are not limited to, alerts generated by cable set-top boxes, vehicles, or computer alerts such as an incorrect username and/or password. Those of skill in the art will understand that the system alerts are not limited to the system alerts described above but include other alerts that may be available from, for example, the infrastructure. In an embodiment, system alerts 102 is used by the score fusion block 150.

In an embodiment, ground truth 103 includes data streams of known actors of an activity, e.g., a data stream for a known energy thief. The ground truth 103 typically includes one or more entities and their corresponding data streams that display attributes of a desired activity that is being monitored. In an energy theft scenario, the ground truth 103 would correspond to a set of the meter read data (i.e., data stream) of one or more known energy thieves. In an embodiment, ground truth 103 is used by the truth comparison block 140.

In an embodiment, the peer comparison 120, self comparison 130, and/or truth comparison 140 modules may use regression analysis or other forecasting techniques to predict data streams moving forward for an individual. The data streams may correlate with impact variables where the impact variables may affect a data stream. Impact variables 104 include, but are not limited to, an hour of the day, a day of the week, a temperature value local to an entity, a cloud cover value local to an entity, a humidity value local to an entity, a minutes of sun value local to an entity, a holiday schedule for an entity, a television schedule for an entity, and combinations thereof. In an embodiment, external variables needed for data stream forecasting are provided to the activity detection system and/or process as impact variables. As a non-limiting example, in an energy theft scenario external variables include weather, season, and day of the week. In other industries the impact variables may be different, as appropriate for that industry. In an embodiment, impact variables 104 are used by the peer comparison block 120, the self comparison block 130, and the truth comparison block 140.

In an embodiment, external data 105 includes attributes of an entity that typically are particular to the entity itself. As a non-limiting example, in an energy theft scenario, external data 105 may correspond, where appropriate, with attributes detailing an entity's physical premises, an entity's demographics, an entity's financial state, or combinations thereof. Additionally, external data 105 may include one or more of premises attributes such as square footage, type of construction materials, the presence of a basement, a local air conditioning code, and a location. Furthermore, external data 105 may include one or more of demographic attributes such as an age of an entity or the ages of the occupants of a premises, a number of persons in the premises, ethnicity of an entity, an indicator of an environmental interest of an entity, and whether the entity owns or rents a premises. Still further, external data 105 may include one or more of financial attributes such as attributes of a financial cluster to which an entity may belong, a credit score for the entity, a mortgage amount for the entity, and a credit state for the entity. In an embodiment, external data 105 is used by the peer comparison block 120.

Figure 2:
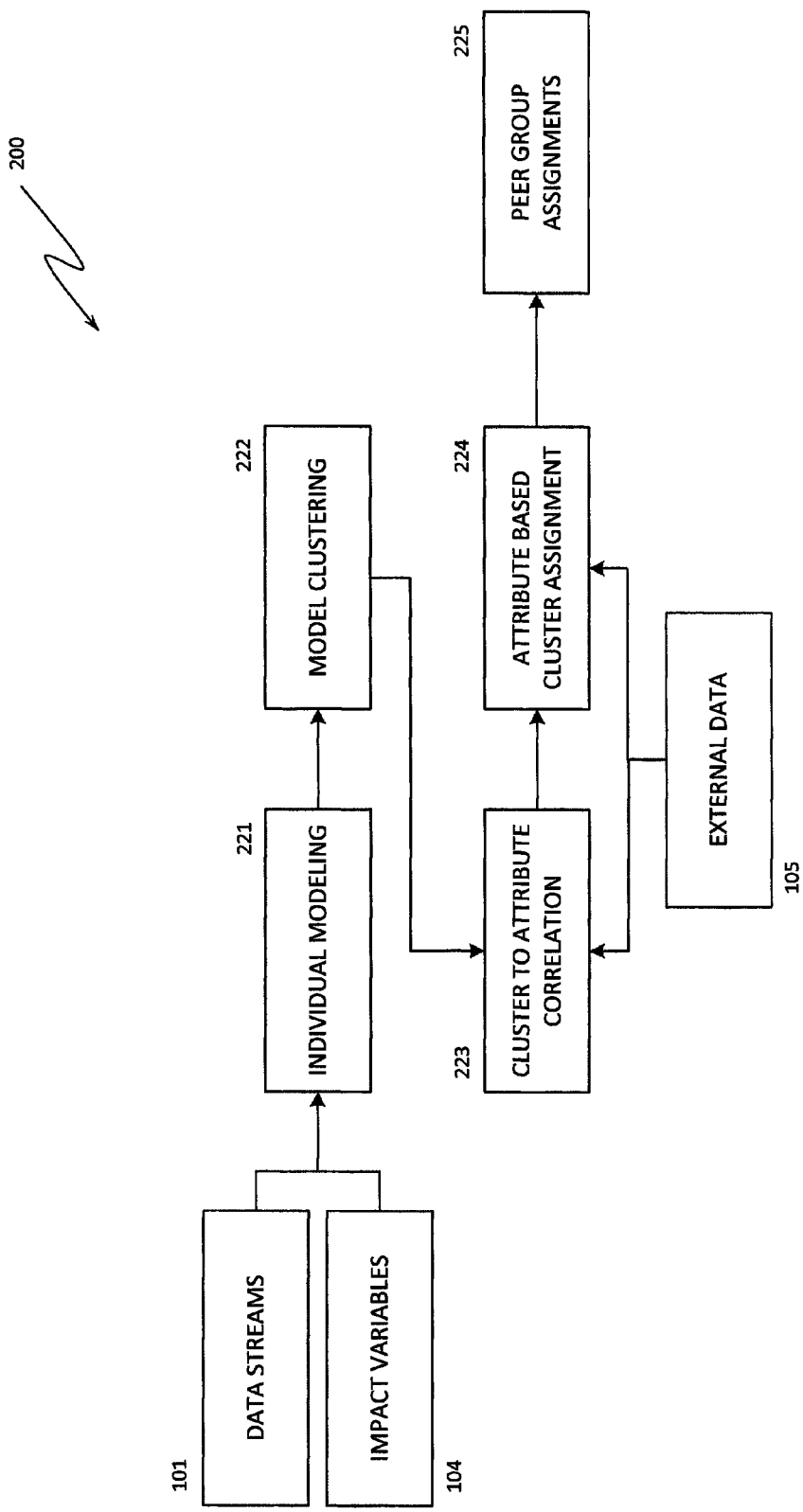
FIG. 2 is a flow chart for a peer group assignment process used as part of the peer comparison process in FIG. 1, according to an embodiment of the present subject matter.

Considering FIG. 2, a flow chart for a peer group assignment process 200 which is used as part of the peer comparison process 120 in FIG. 1 is presented, according to an embodiment of the present subject matter. As stated above, the peer comparison process 120 is used to compare the activity (e.g., a data stream) of an entity to the activity of the entity's peers. In an embodiment, the peer comparison process includes assigning an entity to one or more peer groups.

In an embodiment, the peer group assignment process 200 is used to identify one or more peer groups for an entity when those peer groups are not known a priori. If peer groups for an entity have already been identified, those peer group assignments can be used and the peer group assignment process 200 may be skipped. For an entity or sets of entities with unknown peer groups, identifying the peer groups which each of those entities may belong may follow a process similar to the peer group assignment process 200. In an embodiment, data streams 101 for an entity and any predetermined impact variables 104 are use in order to create an individual model 221 for each entity. The individual model 221 may include a regression model with several different coefficients. If regression modeling is not the best suited model for the type of data stream available, other modeling approaches may be used. Once an individual model 221 is generated for each entity, a model clustering process 222 can be employed on the individual models. The model clustering process 222 operates to group entities with similar individual models. A non-limiting example of a model clustering approach includes using a Gaussian mixture model coupled with an expectation maximization fitting algorithm to group entities into clusters. The output of the model clustering process 222 is used to train the predictive model used in the cluster to attribute correlation process 223.

In an embodiment, external data 105, as discussed above, is used to predict the peer group assignments in process 225 without considering the data streams of the entities, as follows. In the cluster to attribute correlation process 223, a correlation process is utilized in which external data 105 is used to predict particular clusters of attributes of the entities. In an embodiment, the output of the model clustering process 222 is used to train the predictive model used in the cluster to attribute correlation process 223, as stated above. The correlation process may include one or more different forms of correlation. One such form may be a decision tree type of analysis. Once attribute to peer group correlations are learned in the cluster to attribute correlation process 223, the attribute correlation model is used to assign each entity to a cluster in the attribute based cluster assignment process 224. Then, the entities are assigned to one or more peer groups in the peer group assignment process 225.

In an embodiment, entities are assigned to clusters based on similarity between their data stream models. Once clusters of similar data streams have been identified, external attributes are used to predict to which cluster an entity should belong, such that an entity is clustered only by that entity's external attributes, not by that entity's data stream and/or individual model. An entity may be assigned to exactly one cluster, or an entity may be assigned a likelihood of belonging to several clusters. As a non-limiting example, a peer group for the electric utility industry may correspond to a group of entities that use a similar amount of energy and respond similarly to impact variables such as weather.

Figure 3:
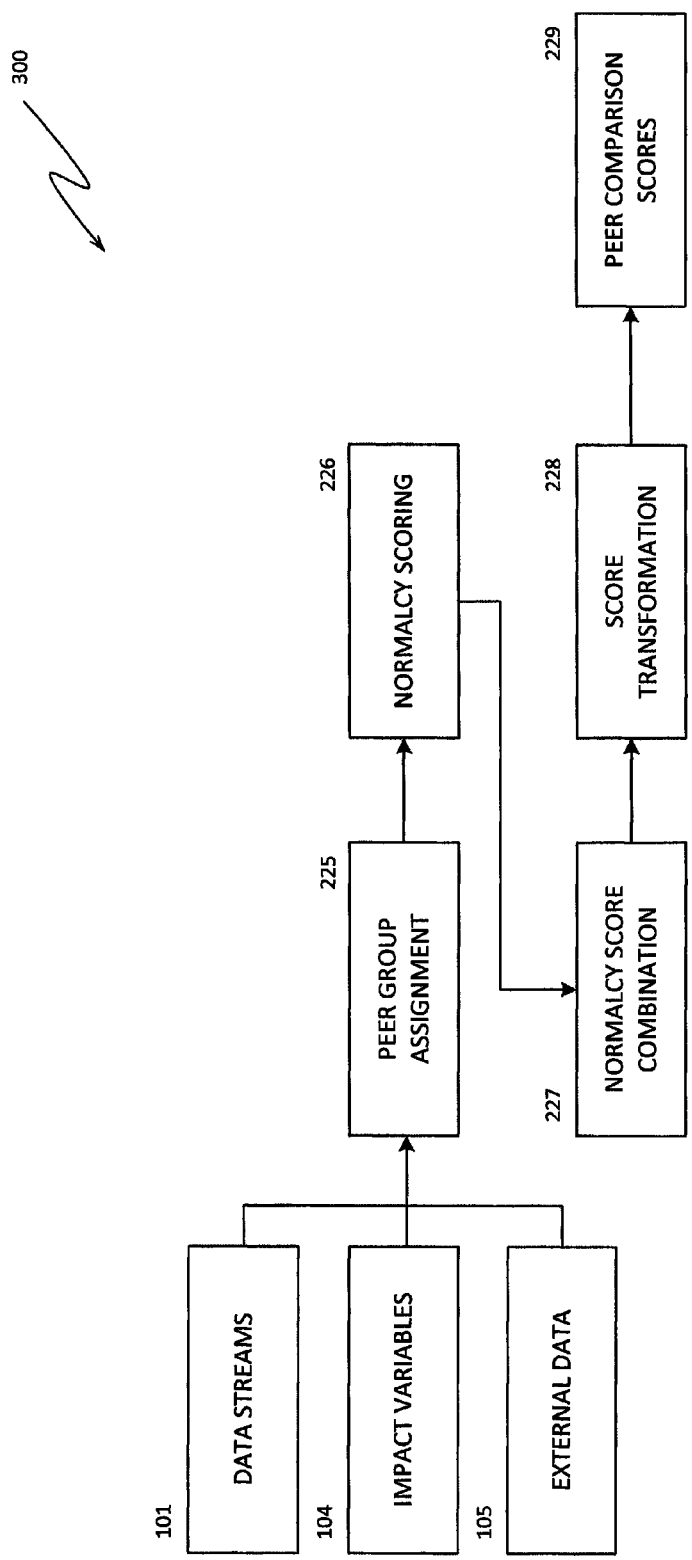
FIG. 3 is a flow chart for a peer comparison scoring process used as part of the peer comparison process in FIG. 1, according to an embodiment of the present subject matter.

FIG. 3 displays a flow chart for a peer comparison scoring process 300 used as part of the peer comparison process 120 in FIG. 1, according to an embodiment of the present subject matter. In an embodiment, the peer comparison scoring process 300 uses the peer group assignment process 200 as described in FIG. 2, including the use of data streams 101, impact variables 104, and external data 105, to determine peer group assignments 225.

In an embodiment, once the peer group assignments 225 have been made (based on the entity's external data 105 as described above), the peer comparison scoring process 300 compares, at the normalcy scoring process 226, a first entity's data stream 101 with the data streams of other entities assigned to a particular peer group that includes the first entity. This comparison can take on many forms and provides a method of assessing how similar the first entity is to the other entities in the particular peer group. A normalcy score is calculated, individually, for each peer group cluster that the first entity has been assigned. A typical normalcy scoring process may use the cumulative distribution function of the peer group cluster to estimate how far away an entity is from the majority of his peers in the particular peer group. As a non-limiting example, in an electric energy theft scenario, the peer groups may be characterized by a mean daily kWh usage, and a distribution is fit to the data, such as a Gamma distribution. The normalcy score for each entity to an assigned cluster becomes the cumulative distribution of the Gamma function for the entity's mean daily kWh usage. Thus, the normalcy score provides an indication of the percentage of an entity's peers that use less energy than the entity does.

Since an entity may be assigned with certain probabilities to more than one peer group, the entity's peer group scores for all peer groups to which the entity is assigned are combined in the normalcy score combination process 227. The normalcy score combination may take many forms. In an embodiment, a simple approach may use a weighted average of all normalcy scores weighted by the probability that an individual belongs to that peer group.

After the normalcy score combination process, the score transformation process 228 is utilized to transform the combined normalcy score into a standardized value, such as a 0 to 1 value. A non-limiting example of a score transformation process that may be used is a sigmoid function. The standardized value is the peer comparison score 229. In an embodiment, a peer comparison score closer to 1 provides more indication of the target activity, and a peer comparison score of 0 provides less indication of the target activity. As a non-limiting example, in the case of the energy theft detection peer comparison model, a peer comparison score close to 1 would indicate that an entity had considerably lower usage than the entity's peers which may be an indication of energy theft by the entity.

Figure 4:
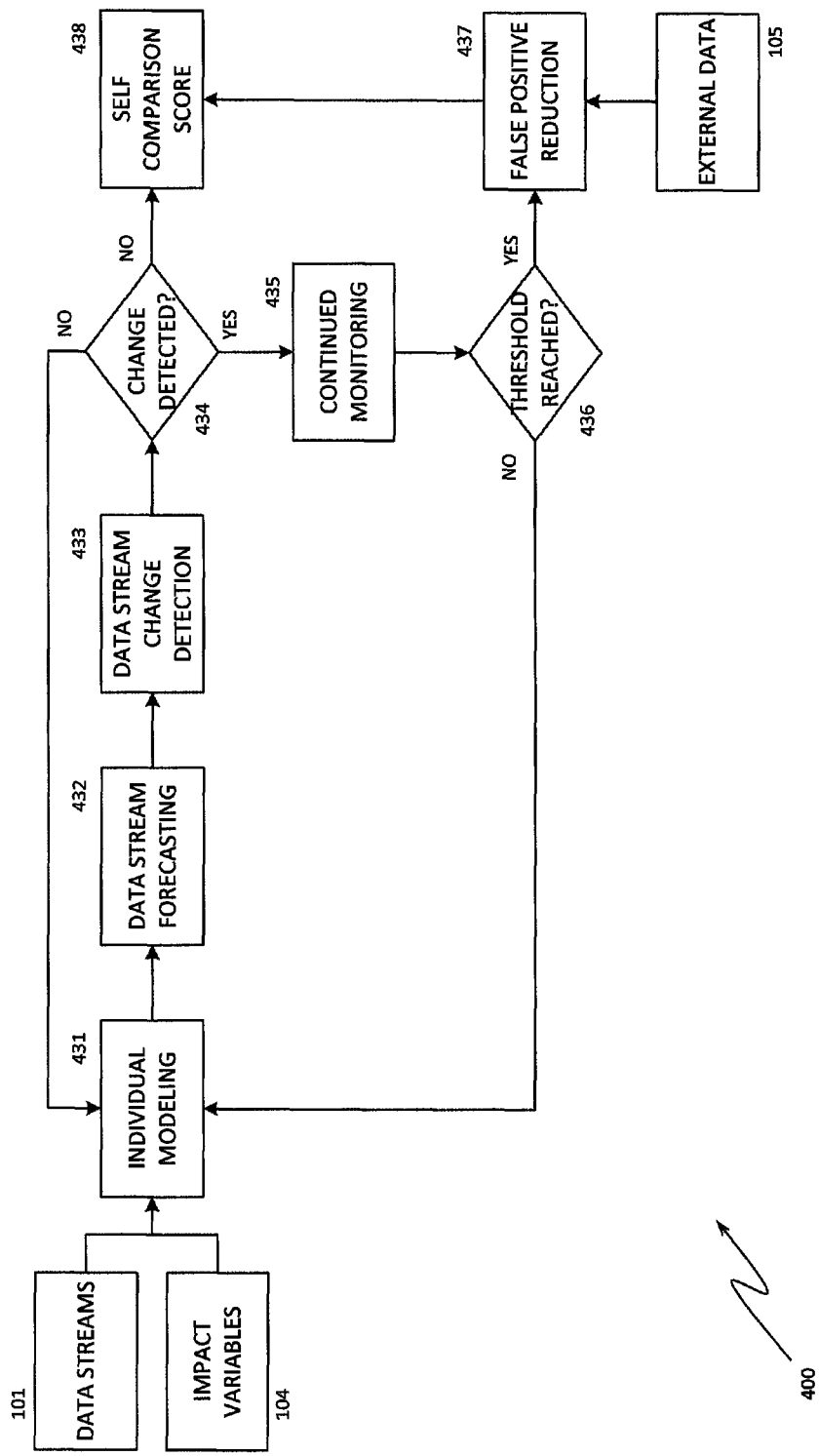
FIG. 4 is a flow chart for a self comparison scoring process used as part of the self comparison process in FIG. 1, according to an embodiment of the present subject matter.

FIG. 4 depicts a flow chart for a self comparison scoring process 400 used as part of the self comparison process 130 in FIG. 1, according to an embodiment of the present subject matter.

In an embodiment, the self comparison module, or process, 130 compares updates to an entity's data stream to the entity's historic data stream. The process involves generating an individual model 431 of the entity's data stream 101 taking into account impact variables 104. The individual model 431 may be, but does not have to be, the same as the individual model 221 in FIG. 2. As a non-limiting example, in an electric energy theft scenario, the individual model 431 may correspond to a regression based linear model of electricity usage based on observed weather parameters. The individual model 431 is then used to create a forecast of the entity's data stream in the data stream forecasting process 432. The data stream forecast for an entity is then compared to actual data stream observations for the entity at data stream change detection process 433 which looks for significant differences (i.e., differences greater than a predetermined threshold) between the data stream forecast and the observed actual data stream values for the entity. As a non-limiting example, in an energy theft scenario, the data stream change detection process 433 may look for usage data that was significantly lower than the entity's forecasted usage. At block 434, if a change is detected, the entity is assigned to a continued monitoring module 435 for continued monitoring.

At block 436, if the observed change is sustained for a certain, predetermined, period of time, the entity is assigned to a false positive reduction process 437. The false positive reduction process is used to search for explanations for the observed change which may entail using input from external data 105. If, at block 436, the observed change is not sustained for the certain, predetermined, period of time, the entity's data stream is considered to be normal, the entity's individual model 431 is updated and the entity continues to be monitored for future unexpected changes.

As a non-limiting example, in an electric energy theft scenario, the false positive reduction process 437 may employ a model that looks to detect if the energy consumption profile for the entity is consistent with an occupied premises versus a vacant premises, or may correlate changes in a premises' demographics to drops in energy consumption. Entities that have a sustained observed change in their data stream and who pass all false positive checks in the false positive reduction process 437 are provided a high self comparison score by the self comparison score process 438 which, in an embodiment, is a score closer to 1.0. Entities whose data streams are consistently similar to their forecasted value, as determined in change detection block 434, are provided self comparison scores, by the self comparison score process 438, which, in an embodiment, are closer to 0.

Figure 5:
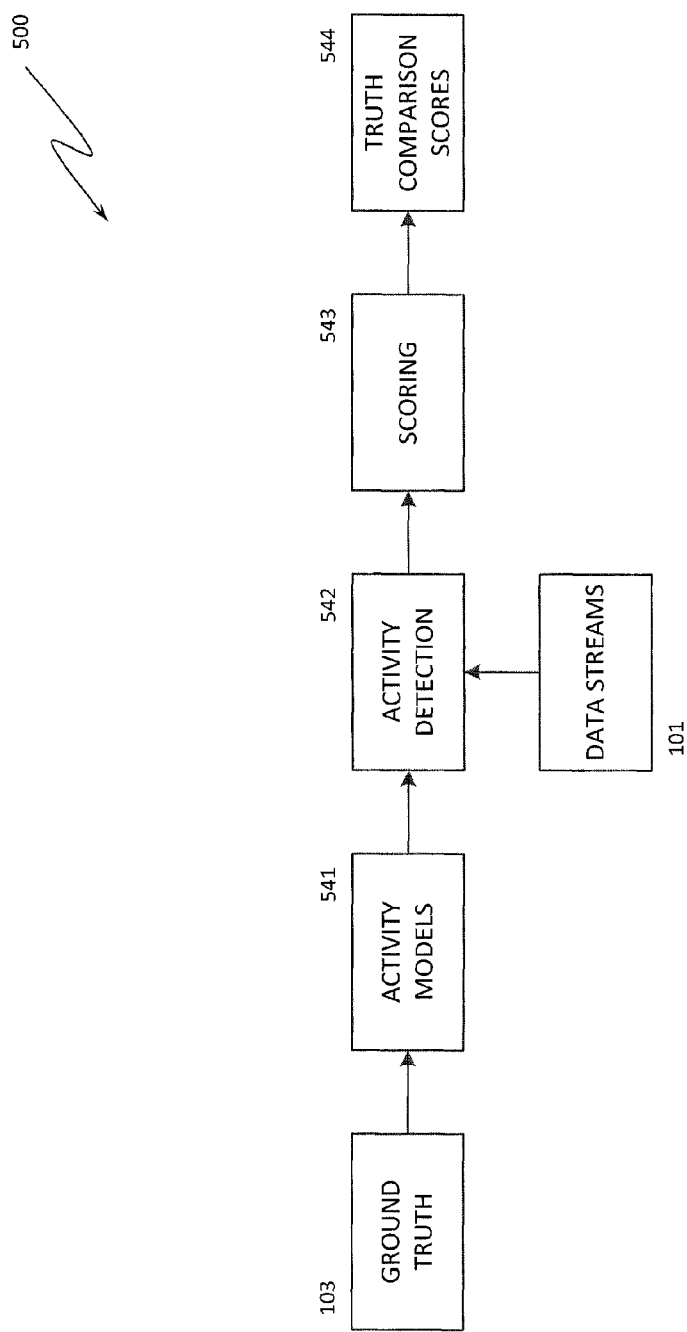
FIG. 5 is a flow chart for a truth comparison scoring process used as part of the truth comparison process in FIG. 1, according to an embodiment of the present subject matter.

Now considering FIG. 5, a flow chart for a truth comparison scoring process 500 is shown which is used as part of the truth comparison process 140 in FIG. 1, according to an embodiment of the present subject matter.

In an embodiment, the truth comparison module, or process, 140 compares an entity's data stream to data streams of entities exhibiting the target activity. As a non-limiting example, in an energy theft scenario, the truth comparison module 140 may compare the energy consumption patterns of known energy thieves, i.e., ground truth 103, to energy consumption patterns (i.e., data streams) of other entities in the system. If the interval data of a utility customer entity matches the patterns exhibited by known thieves of the utility, the entity would be given, in an embodiment, a high score for the truth comparison module 140.

In an embodiment, the truth comparison module 140 contains three main steps. The activity models process 541 defines models of the activity that is being monitored, i.e., the target activity. Since there may be more than one indicator of a target activity, there may be more than one activity model 541. In a non-limiting example, in the case of energy theft detection one activity model may use the ground truth data stream 103 to model known thieves that have stolen energy by intermittently bypassing their meter on nights and weekends, while another activity model may model those thieves that steal energy by tampering with the meter causing it to issue large numbers of false reads and alerts. The data stream 101 of an entity is then compared to the activity models 541 at the activity detection process 542 which results in a score at scoring process 543. If an entity's data stream 101 matches an activity model 541, the entity is given, in an embodiment, a high score from the truth comparison scores process 544. In an embodiment, if an entity's data stream 101 does not compare to any activity models 541, the entity is given, in an embodiment, a low score by the truth comparison scores process 544.

Figure 6:
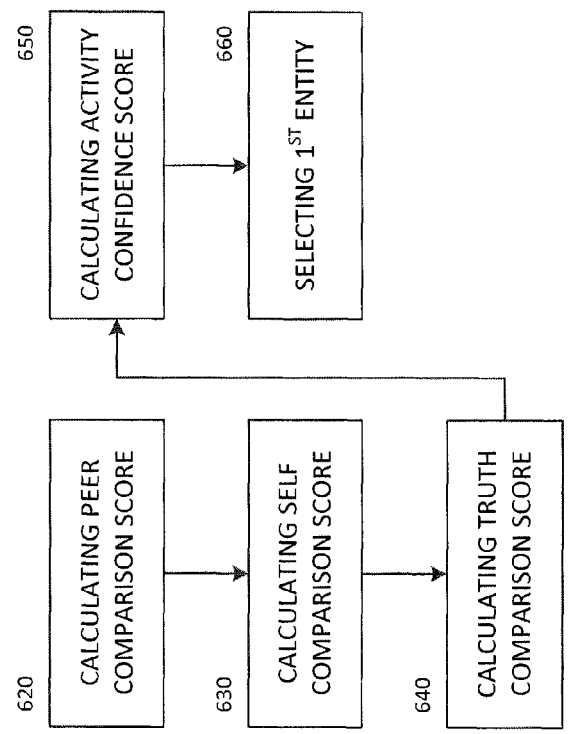
FIG. 6 is a flow chart for a method for detecting the presence of an activity according to an embodiment of the present subject matter.

With attention now drawn to FIG. 6, a flow chart 600 is disclosed for a method for detecting the presence of an activity according to an embodiment of the present subject matter. One or more processors may be used to perform various tasks. At block 620, a peer comparison score for an entity in a group of entities is calculated. At block 630, a self comparison score for the entity is calculated. At block 640, a truth comparison score for the entity is calculated. At block 650, an activity confidence score for the entity is calculated. In an embodiment, the activity confidence score is calculated based at least in part on one or more of the peer comparison score, the self comparison score, and the truth comparison score. At block 660, a first entity from a group of entities is selected based at least in part on the activity confidence score for the first entity.

Figure 7:
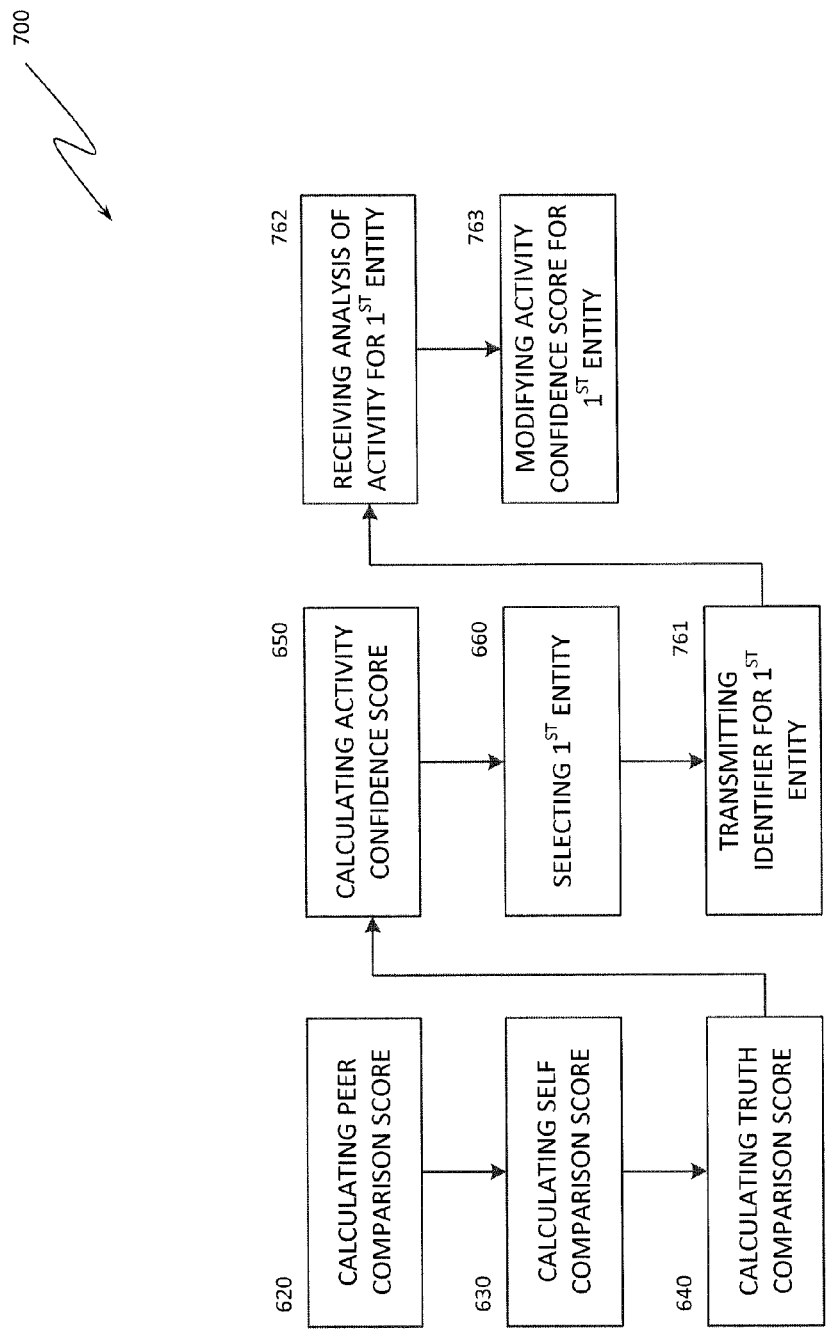
FIG. 7 is a flow chart for a method for detecting the presence of an activity according to another embodiment of the present subject matter.

Now turning to FIG. 7, a flow chart 700 is disclosed for a method for detecting the presence of an activity according to another embodiment of the present subject matter. Blocks 620 through 660 are as described above with respect to FIG. 6. At block 761, a transmitter transmits to an investigation unit an identifier for the selected entity. At block 762, information regarding an analysis of a target activity associated with the first entity is received from the investigation unit. At block 763, the activity confidence score for the selected entity is modified, using the processor, based on the analysis of the target activity associated with the selected entity as provided by the investigation unit.

Figure 8:
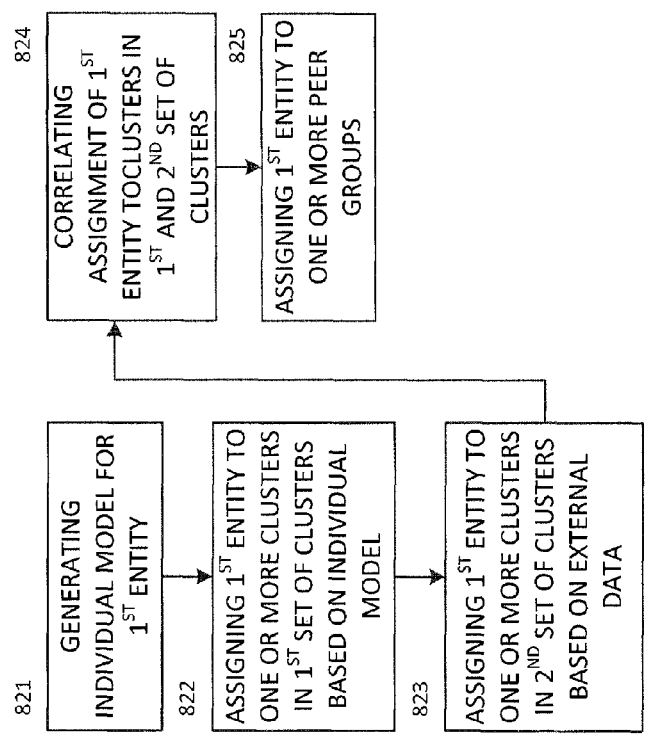
FIG. 8 is a flow chart for a method for calculating a peer comparison score according to an embodiment of the present subject matter.

Considering FIG. 8, a flow chart 800 is displayed for a method for calculating a peer comparison score 620 in FIG. 6 according to an embodiment of the present subject matter. At block 821, an individual model for the first entity is generated based on at least one of a data stream for the first entity and an impact variable for the first entity. At block 822, the first entity is assigned to one or more clusters in a first set of clusters based on the individual model for the first entity. At block 823, the first entity is assigned to one or more clusters in a second set of clusters based on a set of external data for the first entity. At block 824, the assigning of the first entity to one or more clusters in the first set of clusters is correlated with the assigning of the first entity to one or more clusters in the second set of clusters and the results of the correlation are used to refine the assigning of the first entity to the second set of clusters. At block 825, the first entity is assigned to at least one peer group based at least in part on the results of the correlation.

Figure 9:
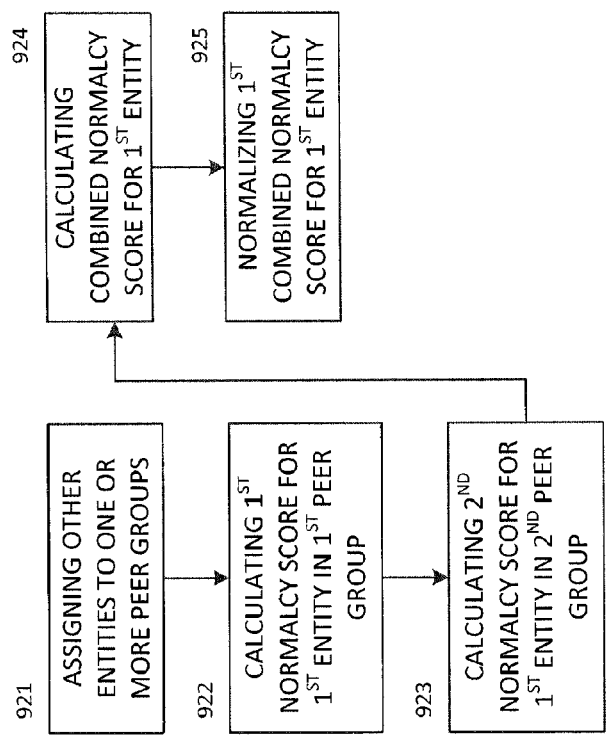
FIG. 9 is a flow chart for additional steps in a method for calculating a peer comparison score according to another embodiment of the present subject matter.

FIG. 9 presents a flow chart 900 for additional steps in a method for calculating a peer comparison score 620 in FIG. 6 according to another embodiment of the present subject matter. At block 921, other entities, not including the first entity, of the group of entities are assigned to one or more peer groups. At block 922, a first normalcy score for the first entity in a first peer group is calculated which includes comparing the data stream for the first entity with the corresponding data streams of other entities assigned to the first peer group. At block 923, a second normalcy score for the first entity in a second peer group is calculated which includes comparing the data stream for the first entity with the corresponding data streams of the other entities in the second peer group. At block 924, a combined normalcy score for the first entity is calculated based on the first normalcy score and the second normalcy score. At block 925, the combined normalcy score for the first entity is normalized.

Figure 10:
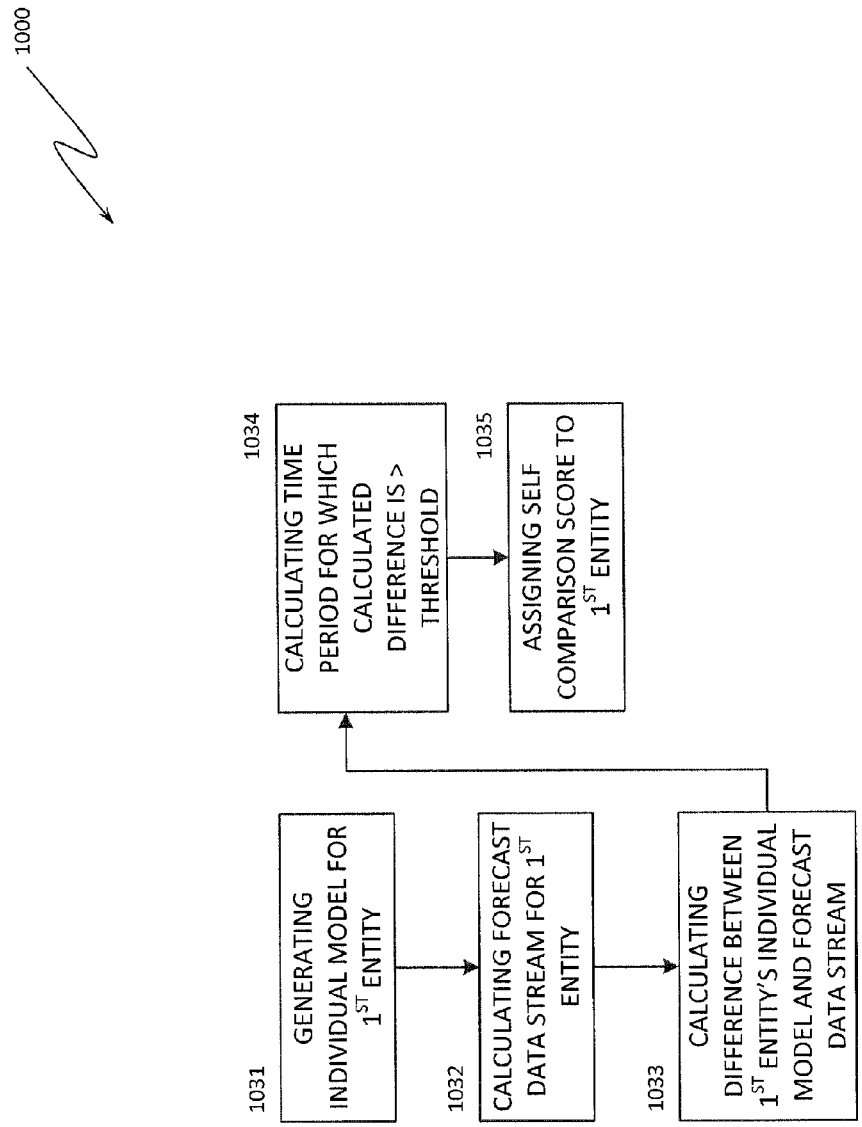
FIG. 10 is a flow chart for a method for calculating a self comparison score according to an embodiment of the present subject matter.

FIG. 10 presents a flow chart 1000 for a method for calculating a self comparison score 620 in FIG. 6 according to an embodiment of the present subject matter. At block 1031, an individual model for the first entity is generated based on at least one of a data stream for the first entity and an impact variable for the first entity. At block 1032, a forecast data stream for the first entity is calculated based at least in part on the individual model for the first entity. At block 1033, a difference is calculated between the individual model for the first entity and the forecast data stream for the first entity. At block 1034, a time period is calculated for which the calculated difference in block 1033 is greater than a predetermined threshold. At block 1035, the self comparison score is assigned to the first entity based on at least one of the calculated difference in block 1033 and the time period calculated in block 1034.

Figure 11:
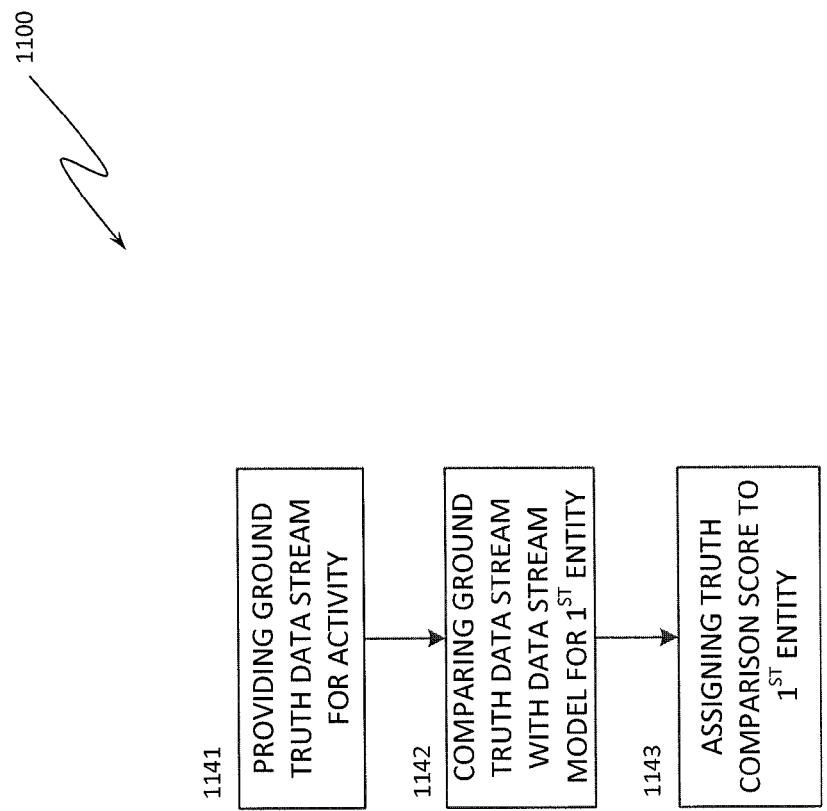
FIG. 11 is a flow chart for a method for calculating a truth comparison score according to an embodiment of the present subject matter.

With attention now drawn to FIG. 11, a flow chart 1100 is shown for a method for calculating a truth comparison score 640 in FIG. 6 according to an embodiment of the present subject matter. At block 1141, ground truth data stream for the activity is provided. At block 1142, the ground truth data stream is compared with a data stream model for the first entity. At block 1143, a truth comparison score is assigned to the first entity based at least in part on a result of the comparison of the ground truth data stream with the data stream model for the first entity.

Figure 12:
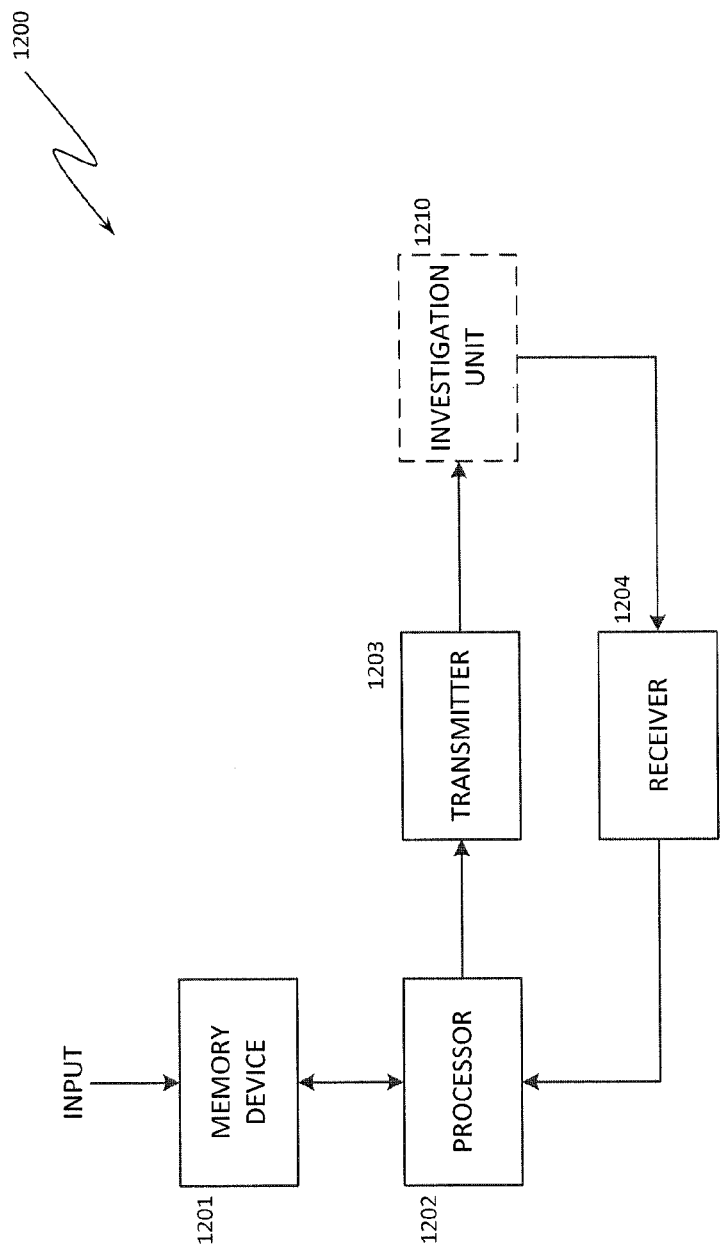
FIG. 12 is a block diagram of a system for detecting the presence of an activity according to an embodiment of the present subject matter.

FIG. 12 presents a block diagram 1200 of a system for detecting the presence of an activity according to an embodiment of the present subject matter. The system includes a memory device 1201 which may be used to store information about each entity in a group of entities. This information may include, but is not limited to, data streams, system alerts, ground truth data streams, impact variables, and external data, all as described above. The system further includes a processor 1201. In an embodiment, the processor 1202 calculates for each entity in the group of entities a peer comparison score for the target activity, a self comparison score for the target activity, a truth comparison score for the target activity, and an activity confidence score. In a further embodiment, the calculation of the activity confidence score is based at least in part on one or more of the peer comparison score, the self comparison score, and the truth comparison score. The processor further performs the task of selecting a first entity from the group of entities based at least in part on the activity confidence score for the first entity.

In a still further embodiment, the system includes a transmitter 1203 for transmitting to an investigation unit 1210 an identifier for the first entity, and a receiver 1204 for receiving from the investigation unit 1210 information regarding an analysis of the target activity associated with the first entity. Additionally, the processor 1202 modifies the activity confidence score for the first entity based on the analysis of the target activity associated with the first entity.

In another embodiment, the system 1200 calculates a peer comparison score and includes circuitry for generating an individual model for the first entity based on at least one of a data stream for the first entity and an impact variable for the first entity; circuitry for assigning the first entity to one or more clusters in a first set of clusters based on the individual model for the first entity; circuitry for assigning the first entity to one or more clusters in a second set of clusters based on a set of external data for the first entity; circuitry for correlating the assigning of the first entity to one or more clusters in the first set of clusters with the assigning of the first entity to one or more clusters in the second set of clusters, where the results of the correlation are used to refine the assigning of the first entity to the second set of clusters; and circuitry for assigning the first entity to at least one peer group based at least in part on the results of the correlation.

In yet another embodiment, the system 1200 further calculates the peer comparison score using circuitry for assigning other entities (i.e., not the first entity) of the plurality of entities to one or more peer groups; circuitry for calculating a first normalcy score for the first entity in a first peer group including comparing the data stream for the first entity with the corresponding data streams of other entities assigned to the first peer group; circuitry for calculating a second normalcy score for the first entity in a second peer group including comparing the data stream for the first entity with the corresponding data streams of the other entities in the second peer group; circuitry for calculating a combined normalcy score for the first entity based on the first normalcy score and the second normalcy score; and circuitry for normalizing the combined normalcy score for the first entity.

In still yet another embodiment, the system 1200 calculates the self comparison score using circuitry for generating an individual model for the first entity based on at least one of a data stream for the first entity and an impact variable for the first entity; circuitry for calculating a forecast data stream for the first entity based at least in part on the individual model for the first entity; circuitry for calculating a difference between the individual model for the first entity and the forecast data stream for the first entity; circuitry for calculating a time period for which the calculated difference is greater than a first predetermined threshold; and circuitry for assigning the self comparison score to the first entity based on at least one of the calculated difference and the time period.

In still yet a further embodiment, the system 1200 calculates the truth comparison score using circuitry for comparing a ground truth data stream for the target activity with a data stream model for the first entity; and circuitry for assigning a truth comparison score to the first entity based at least in part on a result of the comparison of the ground truth data stream with the data stream model for the first entity.

Other embodiments of the present disclosure include a machine-readable medium having stored thereon a plurality of executable instructions to be executed by a processor, the plurality of executable instructions comprising instructions to: calculate for each entity in a plurality of entities: a peer comparison score for the activity for the entity; a self comparison score for the activity for the entity; a truth comparison score for the activity for the entity; and an activity confidence score for the entity; and select a first entity from the plurality of entities, where the selecting is based at least in part on the activity confidence score for the first entity.

A further embodiment includes additional executable instructions comprising instructions to: transmit to an investigation unit an identifier for the first entity; receive from the investigation unit information regarding an analysis of the activity associated with the first entity; and modify the activity confidence score for the first entity based on the analysis of the activity associated with the first entity.

Another embodiment includes additional executable instructions comprising instructions to calculate the activity confidence score based at least in part on one or more of the peer comparison score, the self comparison score, and the truth comparison score.

Still another embodiment includes additional executable instructions comprising instructions to calculate the peer comparison score by: generating an individual model for the first entity wherein the individual model is based on at least one of a data stream for the first entity and an impact variable for the first entity; assigning the first entity to one or more clusters in a first set of clusters, wherein the assigning to the one or more clusters in the first set of clusters is based on the individual model for the first entity; assigning the first entity to one or more clusters in a second set of clusters, wherein the assigning to the one or more clusters in the second set of clusters is based on a set of external data for the first entity; correlating the assigning of the first entity to one or more clusters in the first set of clusters with the assigning of the first entity to one or more clusters in the second set of clusters, wherein the results of the correlation are used to refine the assigning of the first entity to the second set of clusters; and assigning the first entity to at least one peer group, wherein the assigning to the at least one peer group is based at least in part on the results of the correlation.

Yet still another embodiment includes additional executable instructions comprising instructions to calculate the peer comparison score by: assigning other entities of the plurality of entities to one or more peer groups; calculating a first normalcy score for the first entity in a first peer group, wherein the calculating of the first normalcy score includes comparing the data stream for the first entity with the corresponding data streams of other entities assigned to the first peer group; calculating a second normalcy score for the first entity in a second peer group, wherein the calculating of the second normalcy score includes comparing the data stream for the first entity with the corresponding data streams of the other entities in the second peer group; calculating a combined normalcy score for the first entity, wherein the combined normalcy score is based on the first normalcy score and the second normalcy score; and normalizing the combined normalcy score for the first entity.

Yet further embodiment includes additional executable instructions comprising instructions to calculate the self comparison score by: generating an individual model for the first entity wherein the individual model is based on at least one of a data stream for the first entity and an impact variable for the first entity; calculating a forecast data stream for the first entity, wherein the forecast data stream is based at least in part on the individual model for the first entity; calculating a difference between the individual model for the first entity and the forecast data stream for the first entity; calculating a time period for which the calculated difference is greater than a first predetermined threshold; and assigning the self comparison score to the first entity based on at least one of the calculated difference and the time period.

Yet still a further embodiment includes additional executable instructions comprising instructions to calculate the truth comparison score by: comparing a ground truth data stream for the activity with a data stream model for the first entity; and assigning a truth comparison score to the first entity based at least in part on a result of the comparison of the ground truth data stream with the data stream model for the first entity.

While some embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

We claim:

1. A method for detecting the presence of an activity, the method comprising the steps of:
   (a) calculating, using a processor, for each entity in a plurality of entities:
      (i) a peer comparison score for the activity for the entity;
      (ii) a self comparison score for the activity for the entity;
      (iii) a truth comparison score for the activity for the entity; and
      (iv) an activity confidence score for the entity;
   and
   (b) selecting, using the processor, a first entity from the plurality of entities, wherein the selecting is based at least in part on the activity confidence score for the first entity,
   wherein the calculation of the peer comparison score includes the steps of:
   (A) generating, using the processor, an individual model for the first entity wherein the individual model is based on at least one of a data stream for the first entity and an impact variable for the first entity;
   (B) assigning, using the processor, the first entity to one or more clusters in a first set of clusters, wherein the assigning to the one or more clusters in the first set of clusters is based on the individual model for the first entity;
   (C) assigning, using the processor, the first entity to one or more clusters in a second set of clusters, wherein the assigning to the one or more clusters in the second set of clusters is based on a set of external data for the first entity;
   (D) correlating, using the processor, the assigning of the first entity to one or more clusters in the first set of clusters with the assigning of the first entity to one or more clusters in the second set of clusters, wherein the results of the correlation are used to refine the assigning of the first entity to the second set of clusters; and
   (E) assigning, using the processor, the first entity to at least one peer group, wherein the assigning to the at least one peer group is based at least in part on the results of the correlation.

2. The method of claim 1 further comprising the steps of:
   (c) transmitting to an investigation unit an identifier for the first entity;
   (d) receiving from the investigation unit information regarding an analysis of the activity associated with the first entity; and
   (e) modifying, using the processor, the activity confidence score for the first entity based on the analysis of the activity associated with the first entity.

3. The method of claim 1 wherein the calculation of the activity confidence score is based at least in part on one or more of the peer comparison score, the self comparison score, and the truth comparison score.

4. The method of claim 1 wherein the calculation of the peer comparison score includes determining a peer group for each entity in the plurality of entities.

5. The method of claim 1 wherein the data stream for the first entity comprises a time series of data points associated with the activity for the first entity.

6. The method of claim 1 wherein the impact variable for the first entity is selected from the group consisting of: an hour of the day, a day of the week, a temperature value local to the first entity, a cloud cover value local to the first entity, a humidity value local to the first entity, a minutes of sun value local to the first entity, a holiday schedule for the first entity, a television schedule for the first entity, and combinations thereof.

7. The method of claim 1 wherein the external data for the first entity is selected from the group consisting of: premises attributes associated with the first entity, demographic attributes for the first entity, financial attributes for the first entity, and combinations thereof.

8. The method of claim 1 further comprising the steps of:
(F) assigning other entities of the plurality of entities to one or more peer groups;
(G) calculating, using the processor, a first normalcy score for the first entity in a first peer group, wherein the calculating of the first normalcy score includes comparing the data stream for the first entity with the corresponding data streams of other entities assigned to the first peer group;
(H) calculating, using the processor, a second normalcy score for the first entity in a second peer group, wherein the calculating of the second normalcy score includes comparing the data stream for the first entity with the corresponding data streams of the other entities in the second peer group;
(I) calculating, using the processor, a combined normalcy score for the first entity, wherein the combined normalcy score is based on the first normalcy score and the second normalcy score; and
(J) normalizing, using the processor, the combined normalcy score for the first entity.

9. The method of claim 1 wherein the calculation of the self comparison score includes the steps of:
(F) generating, using the processor, an individual model for the first entity wherein the individual model is based on at least one of a data stream for the first entity and an impact variable for the first entity;
(G) calculating, using the processor, a forecast data stream for the first entity, wherein the forecast data stream is based at least in part on the individual model for the first entity;
(H) calculating a difference, using the processor, between the individual model for the first entity and the forecast data stream for the first entity;
(I) calculating, using the processor, a time period for which the calculated difference is greater than a predetermined threshold; and
(J) assigning, using the processor, the self comparison score to the first entity based on at least one of the calculated difference and the time period.

10. The method of claim 1 wherein the calculation of the truth comparison score includes the steps of:
(F) providing a ground truth data stream for the activity;
(G) comparing, using the processor, the ground truth data stream with a data stream model for the first entity; and
(H) assigning a truth comparison score to the first entity based at least in part on a result of the comparison of the ground truth data stream with the data stream model for the first entity.

11. A system for detecting the presence of an activity, the system comprising:
a memory device for storing entity information for each of a plurality of entities;
a processor for calculating for each entity in the plurality of entities:
(i) a peer comparison score for the activity for the entity;
(ii) a self comparison score for the activity for the entity;
(iii) a truth comparison score for the activity for the entity; and
(iv) an activity confidence score for the entity;
and
said processor for selecting a first entity from the plurality of entities, wherein the selecting is based at least in part on the activity confidence score for the first entity,
wherein the processor for the calculation of the peer comparison score includes:
(A) circuitry for generating an individual model for the first entity wherein the individual model is based on at least one of a data stream for the first entity and an impact variable for the first entity;
(B) circuitry for assigning the first entity to one or more clusters in a first set of clusters, wherein the assigning to the one or more clusters in the first set of clusters is based on the individual model for the first entity;
(C) circuitry for assigning the first entity to one or more clusters in a second set of clusters, wherein the assigning to the one or more clusters in the second set of clusters is based on a set of external data for the first entity;
(D) circuitry for correlating the assigning of the first entity to one or more clusters in the first set of clusters with the assigning of the first entity to one or more clusters in the second set of clusters, wherein the results of the correlation are used to refine the assigning of the first entity to the second set of clusters; and
(E) circuitry for assigning the first entity to at least one peer group, wherein the assigning to the at least one peer group is based at least in part on the results of the correlation.

12. The system of claim 11 further comprising:
a transmitter for transmitting to an investigation unit an identifier for the first entity;
a receiver for receiving from the investigation unit information regarding an analysis of the activity associated with the first entity; and
said processor for modifying the activity confidence score for the first entity based on the analysis of the activity associated with the first entity.

13. The system of claim 11 wherein the calculation of the activity confidence score is based at least in part on one or more of the peer comparison score, the self comparison score, and the truth comparison score.

14. The system of claim 11 wherein the processor for the calculation of the peer comparison score further includes:
(F) circuitry for assigning other entities of the plurality of entities to one or more peer groups;
(G) circuitry for calculating a first normalcy score for the first entity in a first peer group, wherein the calculating of the first normalcy score includes comparing the data stream for the first entity with the corresponding data streams of other entities assigned to the first peer group;
(H) circuitry for calculating a second normalcy score for the first entity in a second peer group, wherein the calculating of the second normalcy score includes comparing the data stream for the first entity with the corresponding data streams of the other entities in the second peer group;
(I) circuitry for calculating a combined normalcy score for the first entity, wherein the combined normalcy score is based on the first normalcy score and the second normalcy score; and
(J) circuitry for normalizing the combined normalcy score for the first entity.

15. The system of claim 11 wherein the processor for the calculation of the self comparison score includes:

(F) circuitry for generating an individual model for the first entity wherein the individual model is based on at least one of a data stream for the first entity and an impact variable for the first entity;
(G) circuitry for calculating a forecast data stream for the first entity, wherein the forecast data stream is based at least in part on the individual model for the first entity;
(H) circuitry for calculating a difference between the individual model for the first entity and the forecast data stream for the first entity;
(I) circuitry for calculating a time period for which the calculated difference is greater than a first predetermined threshold; and
(J) circuitry for assigning the self comparison score to the first entity based on at least one of the calculated difference and the time period.

16. The system of claim 11 wherein the processor for the calculation of the truth comparison score includes:
(F) circuitry for comparing a ground truth data stream for the activity with a data stream model for the first entity; and
(G) circuitry for assigning a truth comparison score to the first entity based at least in part on a result of the comparison of the ground truth data stream with the data stream model for the first entity.

17. A machine-readable medium having stored thereon a plurality of executable instructions to be executed by a processor, the plurality of executable instructions comprising instructions to:
(a) calculate for each entity in a plurality of entities:
 (i) a peer comparison score for the activity for the entity;
 (ii) a self comparison score for the activity for the entity;
 (iii) a truth comparison score for the activity for the entity; and
 (iv) an activity confidence score for the entity; and
(b) select a first entity from the plurality of entities, wherein the selecting is based at least in part on the activity confidence score for the first entity,
wherein the executable instructions further comprise instructions to calculate the peer comparison score by:
(A) generating an individual model for the first entity wherein the individual model is based on at least one of a data stream for the first entity and an impact variable for the first entity;
(B) assigning the first entity to one or more clusters in a first set of clusters, wherein the assigning to the one or more clusters in the first set of clusters is based on the individual model for the first entity;
(C) assigning the first entity to one or more clusters in a second set of clusters, wherein the assigning to the one or more clusters in the second set of clusters is based on a set of external data for the first entity;
(D) correlating the assigning of the first entity to one or more clusters in the first set of clusters with the assigning of the first entity to one or more clusters in the second set of clusters, wherein the results of the correlation are used to refine the assigning of the first entity to the second set of clusters; and
(E) assigning the first entity to at least one peer group, wherein the assigning to the at least one peer group is based at least in part on the results of the correlation.

18. The machine-readable medium of claim 17 having stored thereon additional executable instructions, the additional executable instructions comprising instructions to:
(c) transmit to an investigation unit an identifier for the first entity;
(d) receive from the investigation unit information regarding an analysis of the activity associated with the first entity; and
(e) modify the activity confidence score for the first entity based on the analysis of the activity associated with the first entity.

19. The machine-readable medium of claim 17 having stored thereon additional executable instructions, the additional executable instructions comprising instructions to calculate the activity confidence score based at least in part on one or more of the peer comparison score, the self comparison score, and the truth comparison score.

20. The machine-readable medium of claim 17 having stored thereon additional executable instructions, the additional executable instructions comprising instructions to calculate the peer comparison score by:
(F) assigning other entities of the plurality of entities to one or more peer groups;
(G) calculating a first normalcy score for the first entity in a first peer group, wherein the calculating of the first normalcy score includes comparing the data stream for the first entity with the corresponding data streams of other entities assigned to the first peer group;
(H) calculating a second normalcy score for the first entity in a second peer group, wherein the calculating of the second normalcy score includes comparing the data stream for the first entity with the corresponding data streams of the other entities in the second peer group;
(I) calculating a combined normalcy score for the first entity, wherein the combined normalcy score is based on the first normalcy score and the second normalcy score; and
(J) normalizing the combined normalcy score for the first entity.

21. The machine-readable medium of claim 17 having stored thereon additional executable instructions, the additional executable instructions comprising instructions to calculate the self comparison score by:
(F) generating an individual model for the first entity wherein the individual model is based on at least one of a data stream for the first entity and an impact variable for the first entity;
(G) calculating a forecast data stream for the first entity, wherein the forecast data stream is based at least in part on the individual model for the first entity;
(H) calculating a difference between the individual model for the first entity and the forecast data stream for the first entity;
(I) calculating a time period for which the calculated difference is greater than a first predetermined threshold; and
(J) assigning the self comparison score to the first entity based on at least one of the calculated difference and the time period.

22. The machine-readable medium of claim 17 having stored thereon additional executable instructions, the additional executable instructions comprising instructions to calculate the truth comparison score by:
(F) comparing a ground truth data stream for the activity with a data stream model for the first entity; and
(G) assigning a truth comparison score to the first entity based at least in part on a result of the comparison of the ground truth data stream with the data stream model for the first entity.

* * * * *